Patented Nov. 21, 1950

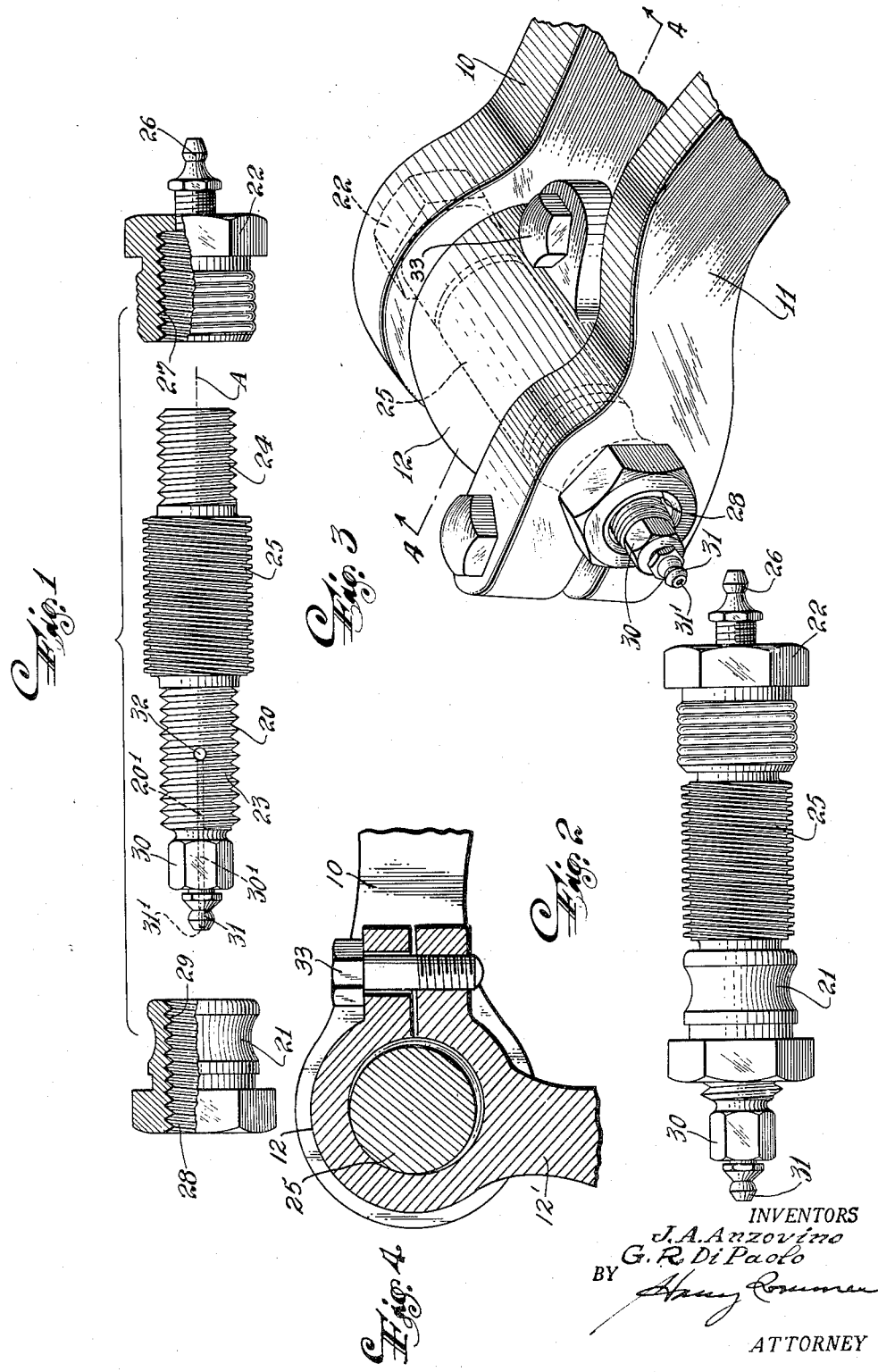

2,531,326

UNITED STATES PATENT OFFICE 2,531,326

ADJUSTABLE AUTOMOTIVE UPPER CONTROL PIN

Gerard R. Di Paolo, North Arlington, and Joseph A. Anzovino, Elizabeth, N. J., assignors to Regal Tool & Mfg. Co., Inc., East Newark, N. J., a corporation of New Jersey Application April 10, 1948, Serial No. 20,178

2 Claims. (Cl. 287—100)

1

This invention relates to improvements in adjustable automobile upper control pins, such as are used to connect shock absorber arms to steering knuckles in automotive vehicles. By virtue of the considerable weight carried by such control pins and their exposure to the elements, it becomes difficult to rotate the same when required for caster and camber adjustment purposes. This situation is made doubly difficult by virtue of the fact that, in the constructions heretofore provided for this purpose, the operation of rotating the pin and obtaining accurate adjustment thereof frequently required several hours' time and was a tedious operation, due to the structural characteristics of the pins.

The pin constructed pursuant to our invention is adapted to be accurately rotated in a matter of only a fraction of the time required where the conventional type of pin is used; the pin of our invention further provides for ample and adequate leverage to facilitate rotation thereof for adjustment purposes.

These and other advantageous objects, which will appear from the drawings, and from the description hereinafter, are accomplished by the structure of our invention, of which an embodiment is illustrated in the drawings. It will be apparent, from a consideration of said drawings, and the following description, that the invention may be embodied in other forms suggested thereby, and such other forms as come within the scope of the appended claims are to be considered within the scope and purview of the instant invention.

In the drawings:

Fig. 1 is an exploded view of an adjustment pin and bushings therefor, constructed pursuant to our invention, Fig. 2 is a plan view thereof in assembled position, Fig. 3 is a perspective view of the pin of our invention connecting the shock absorber arms and steering knuckles elements (fragmentarily shown) of an automotive vehicle, and Fig. 4 is a transverse, sectional view, taken on line 4—4 of Fig. 3.

As shown in the drawings, the pin of our invention is adapted to connect the ends of the conventional upper control arms 10 and 11 of a shock absorber unit to a split bearing 12 of a steering knuckle support 12'. The pin of our invention comprises a body member 20 to be journalled in bushings 21, 22 in the shock absorber arms 11 and 10 respectively. Said bushings have internally threaded portions with

2 which the threaded end sections 23 and 24 of the pin are adapted to have complementary engagement. The pin is further provided with a medially threaded portion 25 for complementary threaded engagement with the internally threaded portion of the steering knuckle support bearing 12 being clamped therein on tightening the bolt 33. The bushing 22 is provided with a greasing fitting 26 fixed thereto and communicating with the hollow internally threaded portion 27 of said bushing. The bushing 21 is provided with a longitudinal opening 28, which is internally threaded as shown at 29, Fig. 1, for engagement with the threaded end 23 of said pin. A terminal head piece 30 is secured to the threaded end 23 of the pin, being preferably formed integral therewith or otherwise substantially integrally united therewith, said head piece having an internal greasing fitting 31 secured thereto or formed integral therewith. The greasing fitting 31 and head piece 30 are provided with registering axial apertures 31', 30', the threaded end 23 of the pin being provided with a recess 20' connecting said apertures with a recess 32 angularly disposed with respect to the longitudinal axis A of the pin and communicating with the circumference of the threaded portion 23 thereof. By this arrangement, as will become apparent from an examination of the drawing, the threaded end 23 of the pin may be greased from time to time without disassembling the same, effectively protecting said end from rusting.

It will be further apparent, from an examination of the drawings, that the head piece 30 which, as shown, is preferably of polygonal cross section, may be readily received in the end of a long hand wrench having a complementary socket or opening, providing adequate leverage for rotation of the pin to obtain the necessary caster and camber adjustment required from time to time. To obtain such necessary adjustment with a pin constructed pursuant to our invention, it is simply necessary to loosen the bushing 21, rotate the pin to the degree required, and then retighten the bushing 21. This, as will become apparent, can be done in a fraction of the time necessitated by pins of the construction heretofore used. The medial section 25 of the pin may be eccentrically disposed with respect to the longitudinal axis A of the pin where it is desired to effect eccentric adjustment on rotation of the pin. Pursuant to the invention, the medial section 25 of the pin is clamped in the split bearing 12 of the steering knuckle support 12', the ends 23, 24 of the pin rotating on the bushings 21, 22 when the car is in motion, pursuant to the movement of the shock absorber arms 10, 11. To make caster and camber adjustments, the bolt 33 is loosened, a conventional long-handled wrench is engaged with the polygonal headpiece 30 of the pin 20, and the pin is rotated to the desired position, to attain the precise caster and camber adjustment. Then the bolt is tightened and the job is done.

Having thus described our invention, what we claim as new and desire to secure by Letters Patent is:

1. An upper control pin for use in an automotive assembly for connecting the split bearing of a steering knuckle support to a pair of shock absorber arms, said bearing being internally threaded and normally tending to open to enable the pin to be rotated therein and having means to tighten the bearing on the pin therein to hold the latter against rotation, the shock absorber arms having bushings provided with internally threaded portions, said pin having an eccentrically disposed medially threaded portion adapted to have complementary threaded engagement with the internally threaded split bearing and having threaded end portions to have complementary threaded engagement with the threaded portions of the bushings, one of said bushings being open throughout its length, the threaded end portion of said pin which threadedly engages said bushing having a terminal polygonal headpiece thereon, said threaded end of the pin and the headpiece being of greater axial length than said bushing so that the polygonal headpiece will, on assembly of the parts, project through said bushing for facility of engagement by a tool, whereby the split bearing tightening means may be released and the polygonal pin headpiece engaged and rotated to provide caster and camber adjustment of the steering knuckle support until the pin has been rotated to the desired degree for caster and camber adjustment purposes, whereupon the bearing may be re-tightened.

2. An upper control pin for use in an automotive assembly for connecting the split bearing of a steering knuckle support to a pair of shock absorber arms, said bearing being internally threaded and normally tending to open to enable the pin to be rotated therein and having means to tighten the bearing on the pin therein to hold the latter against rotation, the shock absorber arms having bushings provided with internally threaded portions, said pin having an eccentrically disposed medially threaded portion adapted to have complementary threaded engagement with the internally threaded split bearing and having threaded end portions to have complementary threaded engagement with the threaded portions of the bushings, one of said bushings being open throughout its length, the threaded end portion of said pin which threadedly engages said bushing having a terminal polygonal headpiece thereon, a grease fitting secured to said headpiece, and registering apertures and recesses in said grease fitting, headpiece and threaded portion of said pin to provide a passageway for grease applied to said fitting, said threaded end of the pin and the headpiece being of greater axial length than said bushing so that the polygonal headpiece will, on assembly of the parts, project through said bushing for facility of engagement by a tool, whereby the split bearing tightening means may be released and the polygonal pin headpiece engaged and rotated to provide caster and camber adjustment of the steering knuckle support until the pin has been rotated to the desired degree for caster and camber adjustment purposes, whereupon the bearing may be re-tightened.

GERARD R. DI PAOLO.
JOSEPH A. ANZOVINO.

REFERENCES CITED

The following references are of record in the file of this patent:

UNITED STATES PATENTS

| Number | Name | Date |
| --- | --- | --- |
| 1,132,348 | Hunter | Mar. 16, 1915 |
| 2,076,852 | Leighton | Apr. 13, 1937 |
| 2,102,420 | Kogstrom | Dec. 14, 1937 |
| 2,428,086 | Leighton | Sept. 30, 1947 |